US012587884B2

(12) United States Patent
Parkulo et al.

(10) Patent No.: US 12,587,884 B2
(45) Date of Patent: Mar. 24, 2026

(54) SAFETY SYSTEM AND METHOD

(71) Applicant: 3M INNOVATIVE PROPERTIES COMPANY, St. Paul, MN (US)

(72) Inventors: Craig M. Parkulo, Midland, NC (US); Wesley M. Barbee, Oxboro, NC (US); Matthew Shannon, Salisbury, NC (US); Ronnie G. Durham, Monroe, NC (US)

(73) Assignee: 3M Innovative Properties Company, St. Paul, MN (US)

( * ) Notice: Subject to any disclaimer, the term of this patent is extended or adjusted under 35 U.S.C. 154(b) by 355 days.

(21) Appl. No.: 18/245,975

(22) PCT Filed: Sep. 27, 2021

(86) PCT No.: PCT/IB2021/058802
§ 371 (c)(1),
(2) Date: Mar. 20, 2023

(87) PCT Pub. No.: WO2022/074503
PCT Pub. Date: Apr. 14, 2022

(65) Prior Publication Data
US 2023/0388831 A1 Nov. 30, 2023

Related U.S. Application Data

(60) Provisional application No. 63/088,696, filed on Oct. 7, 2020.

(51) Int. Cl.
*H04W 24/08* (2009.01)
*H04L 41/0681* (2022.01)
*H04L 41/069* (2022.01)

(52) U.S. Cl.
CPC ......... *H04W 24/08* (2013.01); *H04L 41/0681* (2013.01); *H04L 41/069* (2013.01)

(58) Field of Classification Search
CPC .. H04W 24/08; H04L 41/0681; H04L 41/069; G08B 25/016; G08B 25/009; G08B 25/10; G08B 21/02; H04B 1/385
See application file for complete search history.

(56) References Cited

U.S. PATENT DOCUMENTS 6,686,839 B2 2/2004 Chou et al.
6,826,117 B2 11/2004 Haase et al.
(Continued)

FOREIGN PATENT DOCUMENTS

WO 2019211764 11/2019

OTHER PUBLICATIONS

International Search Report for PCT International Application No. PCT/IB2021/058802, mailed on Dec. 20, 2021, 3 pages.

*Primary Examiner* — Tejis Daya

(57) ABSTRACT

A safety system includes a plurality of alert devices associated with a unique identifier. Each alert device includes a user interface, a wireless transceiver, and a processor communicably coupled to the wireless transceiver. The processor of at least one alert device is configured to generate an alarm signal indicative of an alarm state, and transmit the alarm signal including the unique identifier of the at least one alert device to the wireless transceivers of the other alert devices. The processor of each of the other alert devices is configured to receive the alarm signal from the at least one alert device, determine a link quality indicative of at least a relative distance between the at least one alert device and the corresponding other alert device, and display, via the user interface, an alert message including the unique identifier of the at least one alert device and the corresponding link quality.

18 Claims, 5 Drawing Sheets

(56)            References Cited

U.S. PATENT DOCUMENTS

| | | |
|---|---|---|
| 6,978,159 B2 | 12/2005 | Feng et al. |
| 7,639,147 B2 | 12/2009 | Berezowski et al. |
| 8,988,214 B2 * | 3/2015 | Altman .................... A61B 5/11 |
| | | 340/539.11 |
| 9,024,748 B2 | 5/2015 | Haase et al. |
| 9,070,268 B2 | 6/2015 | Monacos et al. |
| 9,257,028 B2 | 2/2016 | Parkulo |
| 2006/0023681 A1 * | 2/2006 | A'Rafat ............. G08B 21/0272 |
| | | 370/338 |
| 2007/0229356 A1 | 10/2007 | Kodrin |
| 2008/0007396 A1 * | 1/2008 | Parkulo ................ G01S 13/878 |
| | | 340/539.2 |
| 2009/0315687 A1 | 12/2009 | Kanevsky et al. |
| 2012/0036461 A1 | 2/2012 | Parkulo et al. |
| 2014/0323172 A1 * | 10/2014 | Olsen ..................... H04W 4/06 |
| | | 455/518 |
| 2015/0373521 A1 | 12/2015 | Olesen |
| 2017/0124836 A1 * | 5/2017 | Chung ............... G08B 21/0415 |
| 2018/0122216 A1 | 5/2018 | King |
| 2019/0191278 A1 | 6/2019 | Singh et al. |
| 2019/0206233 A1 * | 7/2019 | Huseth ................. H04W 4/024 |

* cited by examiner

500

510 — PROVIDE PLURALITY OF ALERT DEVICES IN WIRELESS COMMUNICATION WITH EACH OTHER

520 — GENERATE ALARM SIGNAL

530 — TRANSMIT ALARM SIGNAL TO OTHER ALERT DEVICES

540 — DETERMINE LINK QUALITY

550 — DISPLAY ALERT MESSAGE

SAFETY SYSTEM AND METHOD

TECHNICAL FIELD

The present disclosure generally relates to a safety system and a method. More specifically, the present disclosure relates to a safety system including a plurality of alert devices and a method for use with the plurality of alert devices.

BACKGROUND

An alert device may be used by a user in distress (e.g., a firefighter in need of rescue) to alert other nearby users of an emergency condition in a work environment. Conventional alert devices may aid the other users in locating the user in distress by producing a sound signal. Specifically, the other users may locate the user in distress by tracking the sound signal produced by the alert device. For example, the alert device may produce the sound signal when the user (in this example, a firefighter) is motionless for 30 seconds, as per national fire protection association (NFPA) standards. However, the sound signal produced by the alert device may not be audible to the other users under certain conditions. For example, the sound signal may not be audible to the other users when sound emitter ports of the alert device are blocked by dust, debris, water, or the like. This may prevent the other users from providing aid to the user in distress, thereby creating a hazardous situation.

SUMMARY

In one aspect, a safety system is provided. The safety system includes a plurality of alert devices. Each alert device is associated with a unique identifier. Each alert device includes a user interface including a display. Each alert device further includes a wireless transceiver and a processor communicably coupled to the wireless transceiver. The wireless transceivers of the plurality of alert devices are disposed in wireless communication with each other. The processor of at least one alert device is configured to generate an alarm signal indicative of an alarm state of the at least one alert device. The processor of the at least one alert device is further configured to transmit, via the corresponding wireless transceiver, the alarm signal to the wireless transceivers of other alert devices from the plurality of alert devices. The alarm signal includes the unique identifier of the at least one alert device. The processor of each of the other alert devices is configured to receive, via the corresponding wireless transceiver, the alarm signal from the at least one alert device. The processor of each of the other alert devices is further configured to determine a link quality indicative of at least a relative distance between the at least one alert device and the corresponding other alert device. The processor of each of the other alert devices is further configured to display, via the display of the corresponding user interface, an alert message including the unique identifier of the at least one alert device and the corresponding link quality.

In another aspect, a method is provided. The method includes providing a plurality of alert devices disposed in wireless communication with each other. Each alert device is associated with a unique identifier. The method further includes generating an alarm signal indicative of an alarm state of at least one alert device from the plurality of alert devices. The method further includes transmitting the alarm signal to other alert devices from the plurality of alert devices. The alarm signal includes the unique identifier associated with the at least one alert device. The method further includes determining, by each of the other alert devices, a link quality indicative of at least a relative distance between the at least one alert device and the corresponding other alert device. The method further includes displaying, by each of the other alert devices, an alert message including the unique identifier of the at least one alert device and the corresponding link quality.

The details of one or more examples of the disclosure are set forth in the accompanying drawings and the description below. Other features, objects, and advantages of the disclosure will be apparent from the description and drawings, and from the claims.

BRIEF DESCRIPTION OF DRAWINGS

The disclosure may be more completely understood in consideration of the following detailed description in connection with the following figures. The figures are not necessarily drawn to scale. Like numbers used in the figures refer to like components. However, it will be understood that the use of a number to refer to a component in a given figure is not intended to limit the component in another figure labeled with the same number.

DETAILED DESCRIPTION

Figure 1:
FIG. 1 is a block diagram illustrating a safety system according to an embodiment of the present disclosure.
Figure 1:
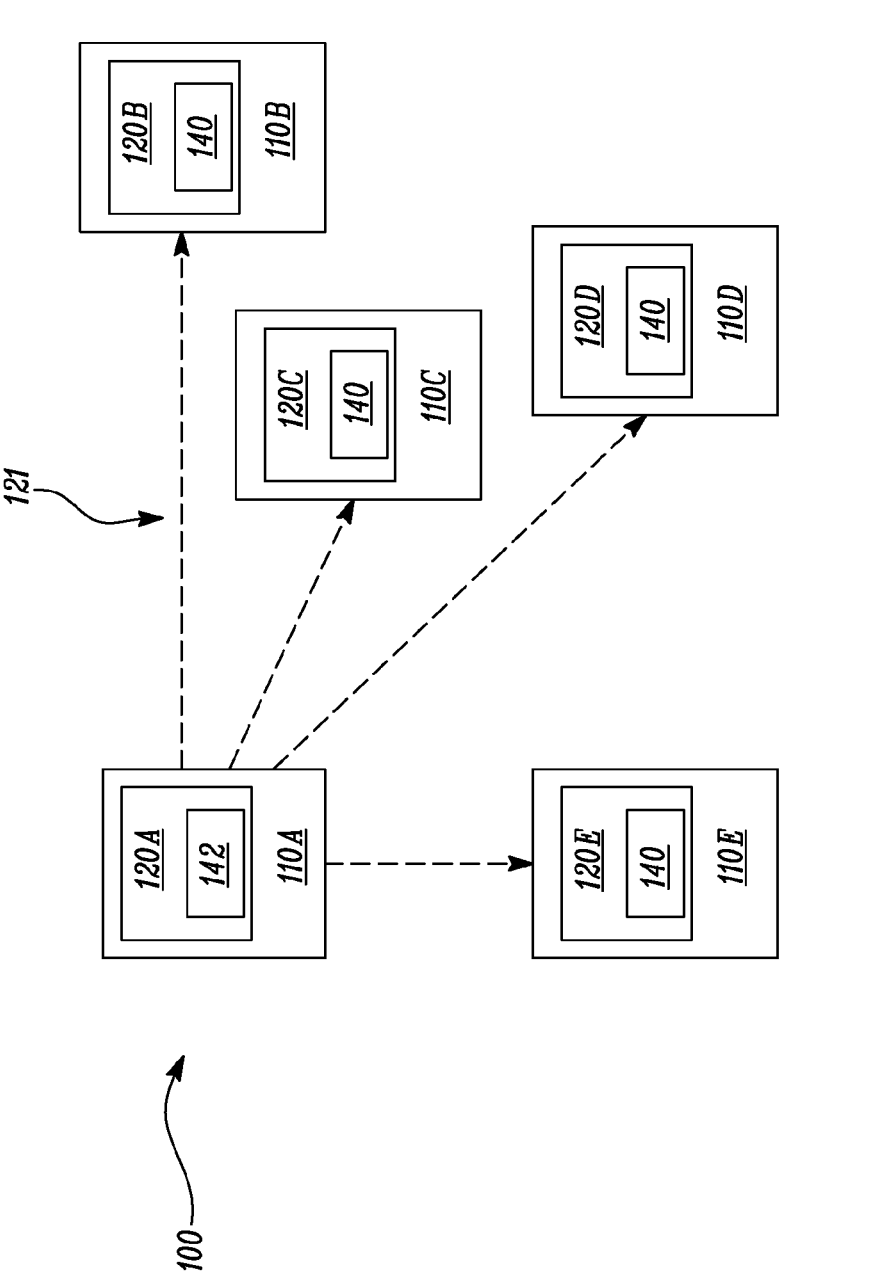

In the following description, reference is made to the accompanying figures that form a part thereof and in which various embodiments are shown by way of illustration. It is to be understood that other embodiments are contemplated and may be made without departing from the scope or spirit of the present disclosure. The following detailed description, therefore, is not to be taken in a limiting sense.

According to various aspects of this disclosure, a safety system includes a plurality of alert devices. Each alert device is associated with a unique identifier. Each alert device includes a user interface including a display. Each alert device further includes a wireless transceiver and a processor communicably coupled to the wireless transceiver. The wireless transceivers of the plurality of alert devices are disposed in wireless communication with each other. The processor of at least one alert device is configured to generate an alarm signal indicative of an alarm state of the at least one alert device. The processor of the at least one alert device is further configured to transmit, via the corresponding wireless transceiver, the alarm signal to the wireless transceivers of other alert devices from the plurality of alert devices. The alarm signal includes the unique identifier of the at least one alert device. The processor of each of the other alert devices is configured to receive, via the corresponding wireless transceiver, the alarm signal from the at least one alert device. The processor of each of the other alert devices is further configured to determine a link quality indicative of at least a relative distance between the at least one alert device and the corresponding other alert device. The processor of each of the other alert devices is further configured to display, via the display of the corresponding user interface, an alert message including the unique identifier of the at least one alert device and the corresponding link quality.

The alert system and the alert devices according to the present disclosure may aid in locating at least one alert device in an alarm state, corresponding to a worker in distress, by other alert devices corresponding to other workers in a hazardous work environment. Therefore, the alert system of the present disclosure may allow the workers to monitor each other in the work environment before a monitoring system arrives at the work environment. The alert system of the present disclosure may further enable the workers to monitor each other in real-time or in a settable delay, and notify the other workers of the worker in distress within a detectable range. Therefore, the alert system may provide rapid location tracking and improved range of detecting a worker in distress. Further, the alert devices may operate despite interference from environmental factors, such as dust, debris, water, and the like, in the work environment. This may further allow rapid location and rescue of the worker in distress where an audible alarm signal of a conventional alert device may be muffled or reduced to a level where it is inaudible. The alert system of the present disclosure may further enable documenting and storing data from the alert devices to a remote server for future analysis and investigations.

Now referring to figures, FIG. 1 illustrates a block diagram of a safety system 100. The safety system 100 may be disposed in a work environment 101. The work environment 101 may be any hazardous environment, such as high temperature environments, construction sites, mining sites, and the like. The safety system 100 may include a plurality of workers 110A-110E (collectively, workers 110) working in the work environment 101. In some embodiments, the workers 110 may include emergency personnel, for example, firefighters. The safety system 100 further includes a plurality of alert devices 120A-120E (collectively, alert devices 120). Specifically, each of the plurality of workers 110A-110E have a corresponding alert device 120A-120E. In some embodiments, the alert devices 120 may be stand-alone devices being carried or worn by the workers 110. In some embodiments, the alert devices 120 may be attached to other garments being worn by the workers 110. The alert devices 120 may be attached to a belt, band, buckle, clip or any other component. The alert devices 120 may be attached by any suitable attachment mechanism. In some cases, the alert devices 120 may be attached to a quick coupling mechanism that enables the alert devices 120 to be removably attached without any tools. In some other embodiments, the alert devices 120 may be divided into multiple sub-assemblies. The alert devices 120 may also be integrated in safety equipment, for example, a breathing apparatus, such as a self-contained breathing apparatus (SCBA). The illustrated embodiment of FIG. 1 shows five workers 110A-110E having corresponding alert devices 120A-120E. In some other embodiments, the safety system 100 may include more than five workers working in the work environment 101. In some other embodiments, the safety system 100 may include less than five workers working in the work environment 101.

The alert devices 120 may operate in two or more operational states. Specifically, the alert devices 120 may at least operate in a normal state 140, and in an alarm state 142. The normal state 140 of the alert device 120 may be a non-alarm state indicative of a normal working condition of the corresponding worker 110. The alarm state 142 of the alert device 120 may be indicative of an emergency condition or a distress condition of the corresponding worker 110, during which the worker 110 may require aid of other nearby workers 110. In the alarm state 142, the alert device 120 generates an alarm signal 121 indicative of the alarm state 142.

The alert devices 120 may switch between the normal state 140 and the alarm state 142. Initially, the alert devices 140 are in the normal state 140. The alert devices 120 may switch to the alarm state 142 when the workers 110 are in distress, and require aid of the other nearby workers 110. The illustrated embodiment of FIG. 1 shows the alert device 120A in the alarm state 142 and the alert devices 120B-120E in the normal state 140.

In some embodiments, the alert devices 120 may switch to the alarm state 142 automatically on detection of the emergency condition. In some other embodiments, the alert devices 120 may switch to the alarm state 142 on manual activation of the alarm state 142 by the workers 110. The alert devices 120 will be described in detail with reference to FIGS. 2A and 2B.

Figure 2B:
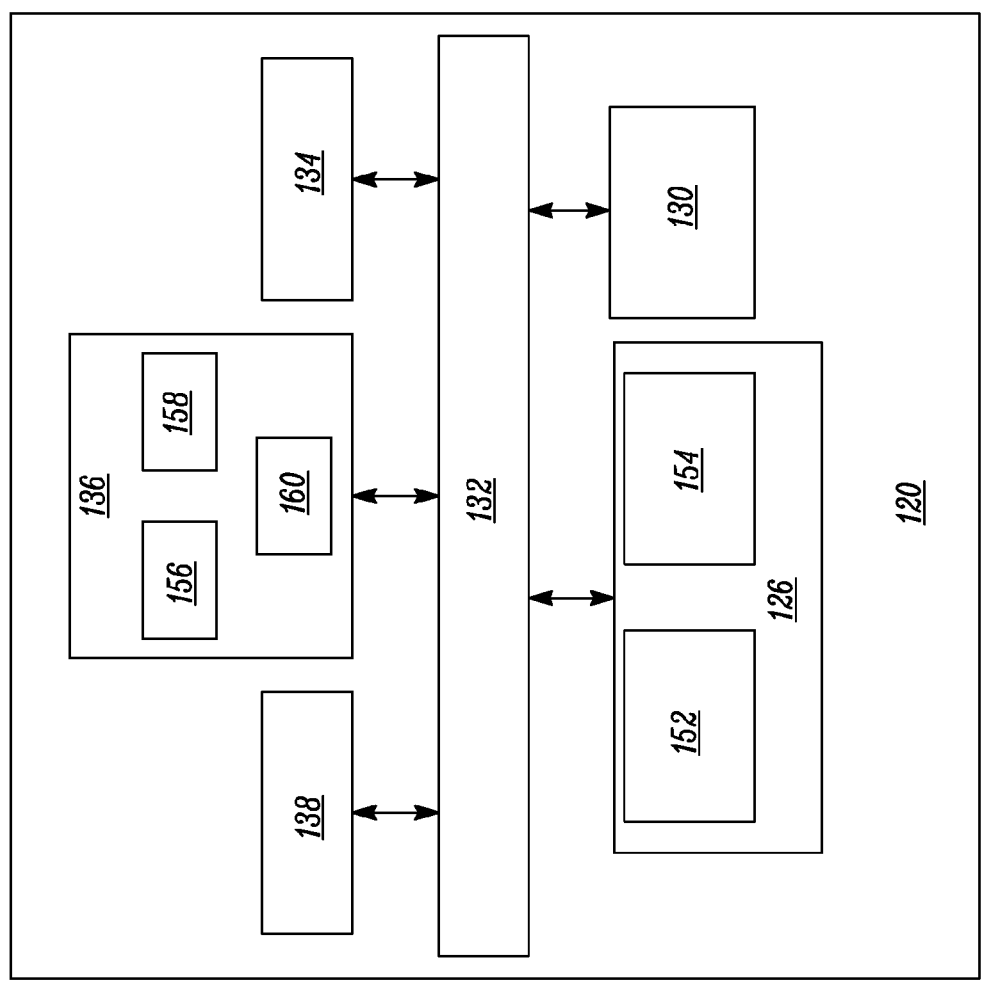
FIG. 2B is a block diagram illustrating various components of the alert device according to an embodiment of the present disclosure.
Figure 2A:
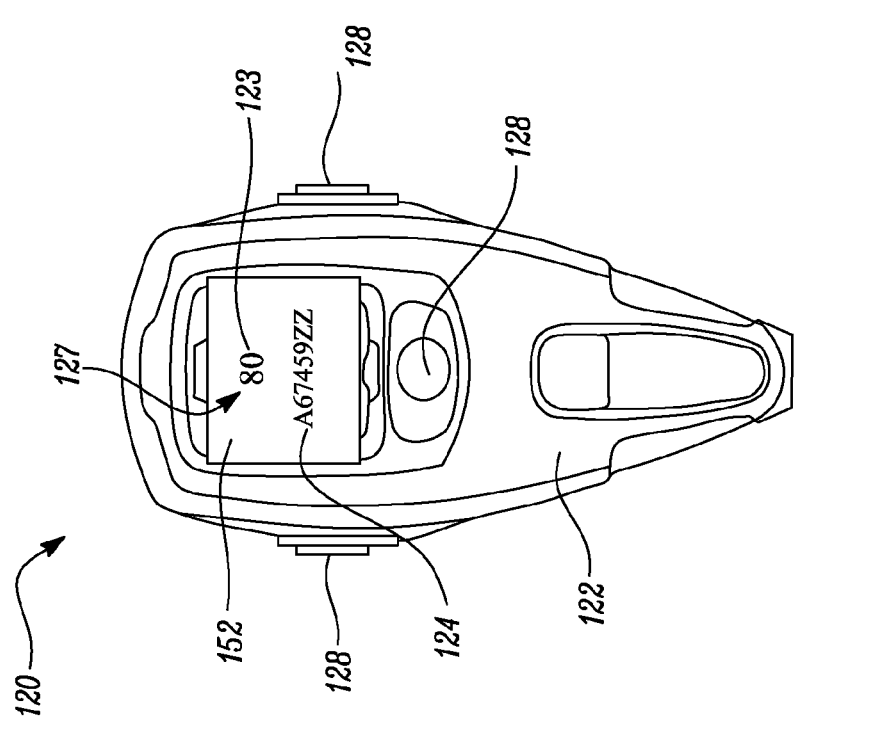
FIG. 2A is a schematic view illustrating an alert device according to an embodiment of the present disclosure.

Referring to FIGS. 2A and 2B, each of the alert devices 120 is associated with a unique identifier 124. The unique identifier 124 is exclusive to each of the alert devices 120. The unique identifier 124 may include a set of alphabets, numerals, symbols, and combinations thereof.

Each of the alert devices 120 further includes a housing 122. The housing 122 may be made of any material, such as a metal, a polymer, or combinations thereof. Any type of polymer may be used, such as thermosetting plastics, thermoplastics, polyethylene terephthalate (PETE), polycarbonate, polyethylene, low-density polyethylene (LDPE), or any other type of plastic. In some embodiments, different portions of the housing 122 may be made of different materials. The housing 122 may include physical and electronic components described hereinafter. In some embodiments, the housing 122 includes one or more buttons 128. Specifically, the one or more buttons 128 are disposed on the housing 122 of each of the alert device 120.

Each of the alert devices 120 includes a user interface 126, a wireless transceiver 130, a processor 132, and a memory 134. The memory 134 is communicably coupled to the processor 132. The memory 134 may be configured store various instructions to be executed by the processor 132. The memory 134 may further be configured for documenting and storing data from the alert devices 120 for future analysis and investigations.

In some embodiments, the user interface 126, the wireless transceiver 130, the processor 132, and the memory 134 are communicably coupled to each other via a BUS. The processor 132 may further be communicably coupled with a sensor array 136. Each of the alert devices 120 may be powered by a battery 138.

The user interface 126 includes a display 152. The display 152 is disposed on the housing 122. The display 152 may be a liquid crystal display (LCD), an organic light emitting diode (OLED) display, and the like. In some embodiments, the LCD may be a seven-segment display. In some embodiments, the user interface 126 of each alert device 120 further includes an audible indicator 154.

The wireless transceivers 130 of the plurality of alert devices 120 are disposed in wireless communication with each other. The wireless transceivers 130 may allow two-way wireless communication between the alert devices 120. In some embodiments, the wireless transceivers 130 of the plurality of alert devices 120 are disposed in wireless communication via Bluetooth®.

The processor 132 is communicably coupled to the wireless transceiver 130. The processor 132 may include any suitable type of processing circuitry, such as one or more general-purpose processors (e.g., ARM-based processors), a Digital Signal Processor (DSP), a Programmable Logic Device (PLD), an Application-Specific Integrated Circuit (ASIC), a Field-Programmable Gate Array (FPGA), etc. In operation, the processor 132 may, for example, receive instructions from the other aforementioned elements (e.g., the memory 134, the user interface 126, the wireless transceiver 130) via the BUS, decode the received instructions, and perform calculations or data processing according to the decoded instructions.

The sensor array 136 may include a motion sensor module 156. The motion sensor module 156 may include a tri-axial magnetometer and a tri-axial accelerometer to provide an inertial guidance system as well as being operative with the processor 132 to provide an indication as to whether the alert device 120 has been motionless for a predefined period of time. However, a simple motion sensor function (without the inertial guidance feature) may likewise be provided by a simple mechanical sensor of conventional design. In some embodiments, this information from the motion sensor module 156 may be used to automatically generate the alarm signal 121 (shown in FIG. 1). In some embodiments, the workers 110 may provide voice commands as input. For instance, the workers 110 may provide voice commands to the alert devices 120. A voice command component may perform natural language processing or other recognition techniques on audible sounds received from the workers 110. Based on the processing of the audible sounds, the voice command component may switch the alert devices 120 from the normal state 140 (shown in FIG. 1) to the alarm state 142 (shown in FIG. 1).

The sensor array 136 may also include other sensor devices and interfaces. These may include, but are not limited to, personal biometric sensors 158 and environmental sensors 160. The personal biometric sensors 158 may be used for monitoring physiological characteristics of the corresponding worker 110. The biometric sensors 158 may include integrated circuits (ICs) for measuring the body temperature of the workers 110 (shown in FIG. 1). A pulse rate, CO2 levels, and other physiological parameters of the workers 110 may be also be measured by the biometric sensors 158. The biometric sensors 158 are preferably located inside the housing 122 of the alert devices 120. The environmental sensors 160 may be used for monitoring environmental characteristics, such as temperature, the presence of gas, and the like. The environmental sensors 160 may also include circuits and may be located inside or outside the housing 122 of the alert devices 120.

The battery 138 may power the various components of the alert devices 120. Examples of the battery 138 may include coin cells, Lithium Ion batteries, and the like. In some embodiments, the battery 138 may be rechargeable. A rechargeable battery, such as a Lithium Ion battery, may provide a compact and long-life source of power.

Now referring to FIGS. 1, 2A and 2B, the safety system 100 includes the plurality of alert devices 120. As shown in FIG. 1, at least one alert device 120A is in the alarm state 142. The other alert devices 120B-120E are in the normal state 140. The processor 132 of the at least one alert device 120A is configured to generate the alarm signal 121 indicative of the alarm state 142 of the at least one alert device 120A. Furthermore, the processor 132 is configured to transmit, via the corresponding wireless transceiver 130, the alarm signal 121 to the wireless transceivers 130 of other alert devices 120B-120E from the plurality of alert devices 120. The alarm signal 121 includes the unique identifier 124 of the at least one alert device 120A.

Concurrently, the processor 132 of each of the other alert devices 120B-120E is configured to receive, via the corresponding wireless transceiver 130, the alarm signal 121 from the at least one alert device 120A. Furthermore, the processor 132 of each of the other alert devices 120B-120E is configured to determine a link quality 123. The link quality 123 may be a derived value based on a distance between the respective other alert devices 120B-120E and the alert device 120A in the alarm state 142. Specifically, the link quality 123 is indicative of at least a relative distance between the at least one alert device 120A and the corresponding other alert device 120B-120E. In some embodiments, the link quality 123 is further indicative of a relative direction between the at least one alert device 120A and the corresponding other alert device 120B-120E. In some embodiments, the link quality 123 may include a derived numeric value. The link quality 123 may vary proportional to the relative distance and the relative direction between the at least one alert device 120A and the corresponding other alert device 120B-120E. For example, the link quality 123 may decrease in numeric value when the relative distance between the alert device 120A and the corresponding other alert device 120B-120E decreases. In another example, the link quality 123 may decrease in numeric value when the relative direction between the alert device 120A and the corresponding other alert device 120B-120E changes. For example, the link quality 123 may decrease when the relative direction changes from North-West to North. In some embodiments, the link quality 123 may further include a relative direction indicator (e.g., North, North-West, etc.), indicative of the relative direction between the at least one alert device 120A and the corresponding other alert device 120B-120E.

In an example, a link quality $LQ(I, J)$ may be a function F of a relative distance $DT(I, J)$ between the at least one alert device 120A and the corresponding other alert device 120B-120E and a relative direction $DR(I, J)$ between the at least one alert device 120A and the corresponding other alert device 120B-120E. In this example, $I=A$ and $J=B$, C, D. Therefore, $DT(A, B)$ and $DR(A, B)$ indicate relative distance and relative direction, respectively, between the alert device 120A and the alert device 120B. Further, $LQ(A, B)$ is the link quality between the alert device 120A and the alert device 120B. $LQ(A, B)$ may be displayed on the alert device 120B.

Mathematically, $LQ(I, J)=F(DT(I, J), DR(I, J))$. The function F may include any suitable combination of the relative distance $DT(I, J)$ and the relative direction $DR(I, J)$. For example, the function F may include one or more polynomials, lookup tables, graphs, a fuzzy model, and so forth.

In some examples, the relative distance $DT(I, J)$ and the relative direction $DR(I, J)$ may be determined using various methods, such as global positioning system (GPS), triangulation, radio direction finding (RDF), inertial navigation, and so forth. Each alert device 120 may include onboard components for determination of the relative distance $DT(I, J)$ and the relative direction $DR(I, J)$. Such onboard components may include GPS sensors, inertial sensors, radio transceivers, etc. The alert devices 120 may communicate with each other to determine the respective link qualities.

The processor 132 of each of the other alert devices 120B-120E is further configured to display, via the display 152 of the corresponding user interface 126, an alert message including the unique identifier 124 of the at least one alert device 120A and the corresponding link quality 123. An exemplary alert message 127 is shown in FIG. 2A.

As discussed above, the user interface 126 further includes the audible indicator 154. In some embodiments, the audible indicator 154 of each alert device 120 is configured to generate an audible alert indicative of the alarm signal 121. Specifically, the audible alert may be generated by the alert device 120A in the alarm state 142. The audible alert may be detectable by workers 110 and/or detectable by the other alert devices 120B-120E. In some embodiments, the other alert devices 120B-120E may detect the audible alert generated by the alert device 120A, and further display a relative position of the alert device 120A.

In some embodiments, the processor 132 of the at least one alert device 120A is further configured to store the alarm signal 121 in the corresponding memory 134. In some embodiments, the processor 132 of each of the other alert devices 120B-120E is further configured to store the unique identifier 124 of the at least one alert device 120A and the corresponding link quality 123 in the corresponding memory 134. In some embodiments, the alarm signal 121 further includes a timestamp (not shown) indicative of a time of generation of the alarm signal 121. The timestamp may also be stored in the memory 134.

In some embodiments, the processor 132 of each of the other alert devices 120B-120E is further configured to change one or more parameters of the corresponding alert message displayed on the display 152 based on user inputs received at the one or more buttons 128. For example, the one or more buttons 128 may increase and decrease the font size of the alert message displayed on the display 152. In another example, the one or more buttons 128 may be used by the workers 110 to switch the corresponding alert devices 120 to the alarm state 142 from the normal state 140. In yet another example, the one or more buttons 128 may be used by the workers 110 to switch the corresponding alert devices 120 to the normal state 140 from the alarm state 142. The one or more buttons 128 may have other functions as well, for example, increasing and decreasing a brightness of the display 152. In some other embodiments, the alert devices 120 may include any other input device (for example, touch input on a touch-enabled device) through which the workers 110 may provide the user input.

Figure 3:
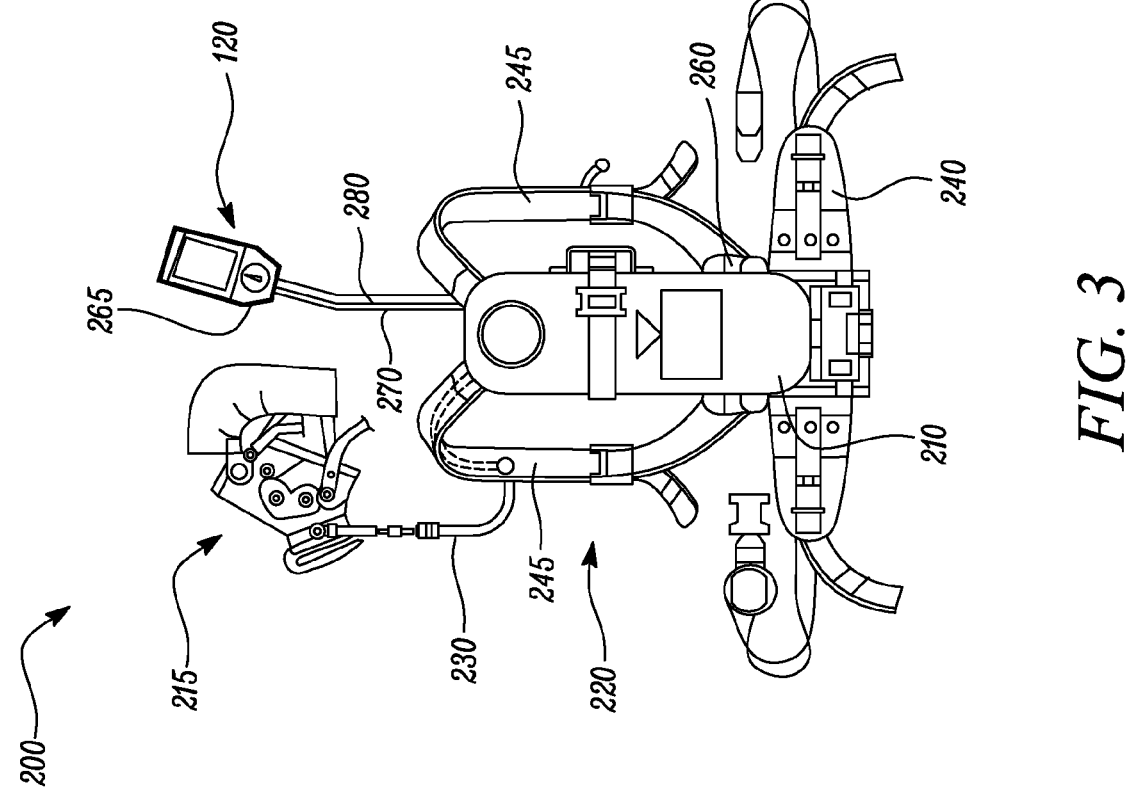
FIG. 3 is a schematic view illustrating a breathing device according to an embodiment of the present disclosure.

FIG. 3 illustrates an exemplary breathing device 200 which may be used by a firefighter or the workers 110A-110E of FIG. 1. In some embodiments, the system 100 (shown in FIG. 1) includes a plurality of breathing devices 200, each alert device 120 being communicably coupled with a corresponding breathing device from the plurality of breathing devices 200.

As illustrated in FIG. 3, the breathing device 200 may include a collection of firefighting or safety equipment, including a high-pressure air tank 210, mounted on a backpack 220, as well as headgear 215 that is worn on a user's head and connected to the air tank 210 by an air supply/data line 230. The line 230 may supply breathable air from the air tank 210 to the user's mouth and nose. The line 230 may also provide power/data communications to other peripherals used in the breathing device 200, such as a heads-up display (not shown) and the like. The breathing device 200 may include a battery (not shown) to power various electronic components. The backpack 220 may include a belt 240 and shoulder straps 245. The belt 240 and the shoulder straps 245 may be adjustable to allow snug fitting of the backpack 220. The breathing device 200 further includes the alert device 120. The alert device 120 may be divided into separate components.

As illustrated in FIG. 3, the alert device 120 is divided into two components, namely an alert unit 260 and an alert console 265. In other words, the alert unit 260 and the alert console 265 together form the alert device 120. The alert unit 260 may include the wireless transceiver 130, the processor 132, and the memory 134 (shown in FIG. 2B). The alert console 265 may include the housing 122, the user interface 126, and the one or more buttons 128 (shown in FIGS. 2A and 2B). The alert unit 260 may be carried in a recess in the backpack 220. The alert console 265 may hang from an end of a pressure data line 270, connected via a pressure reducer to the air tank 210, and a reinforced electronics cable sheath 280. The sheath 280 may include an electronics cable (not shown) that interconnects the alert unit 260 to the alert console 265. The electronics cable may act as the BUS between various components of the alert unit 260 and the alert console 265. The alert unit 260 may be configured to receive an input signal from the breathing device 200 and generate the alarm signal 121 (shown in FIG. 1) based on the input signal. For the input signal, information from the air tank 210 may be gathered via a pressure transducer located in the outlet pathway of the air tank 210. In some embodiments, the alert devices 120 may generate the alarm signal 121 when the air tank 210 is low on air, for example, less than 5% its capacity. In some other embodiments, the alert devices 120 may generate the alarm signal 121 when the alert devices 120 detect no movement of the workers 110 for a predefined period of time. In the illustrated example of FIG. 1, the alert device 120A may generate the alarm signal 121 upon detecting that the worker 110A has been motionless for the predefined period of time.

The alert console 265 may be powered by the battery 138, and the alert unit 260 may be powered by a battery of the breathing device 200. In some other embodiments, the alert unit 260 and the alert console 265 may include respective stand-alone batteries. In some other embodiments, the alert devices 120 may be stand-alone devices communicably connected with the corresponding breathing devices 200. In such embodiments, the alert devices 120 may located in a region similar to the alert console 265, so that the workers 110 may easily access the alert devices 120.

Figure 4:
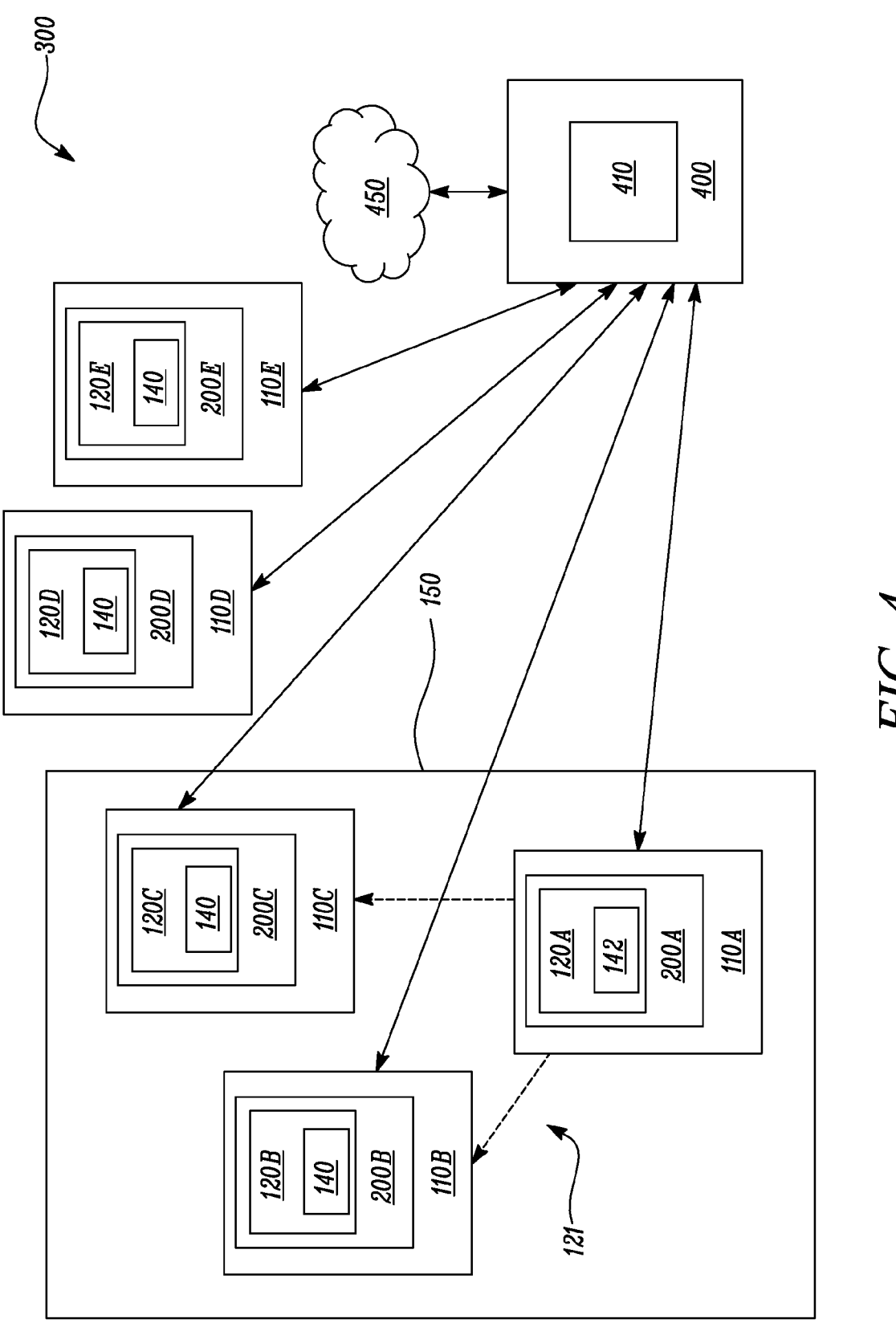
FIG. 4 is a block diagram illustrating a safety system according to another embodiment of the present disclosure.
Figure 5:
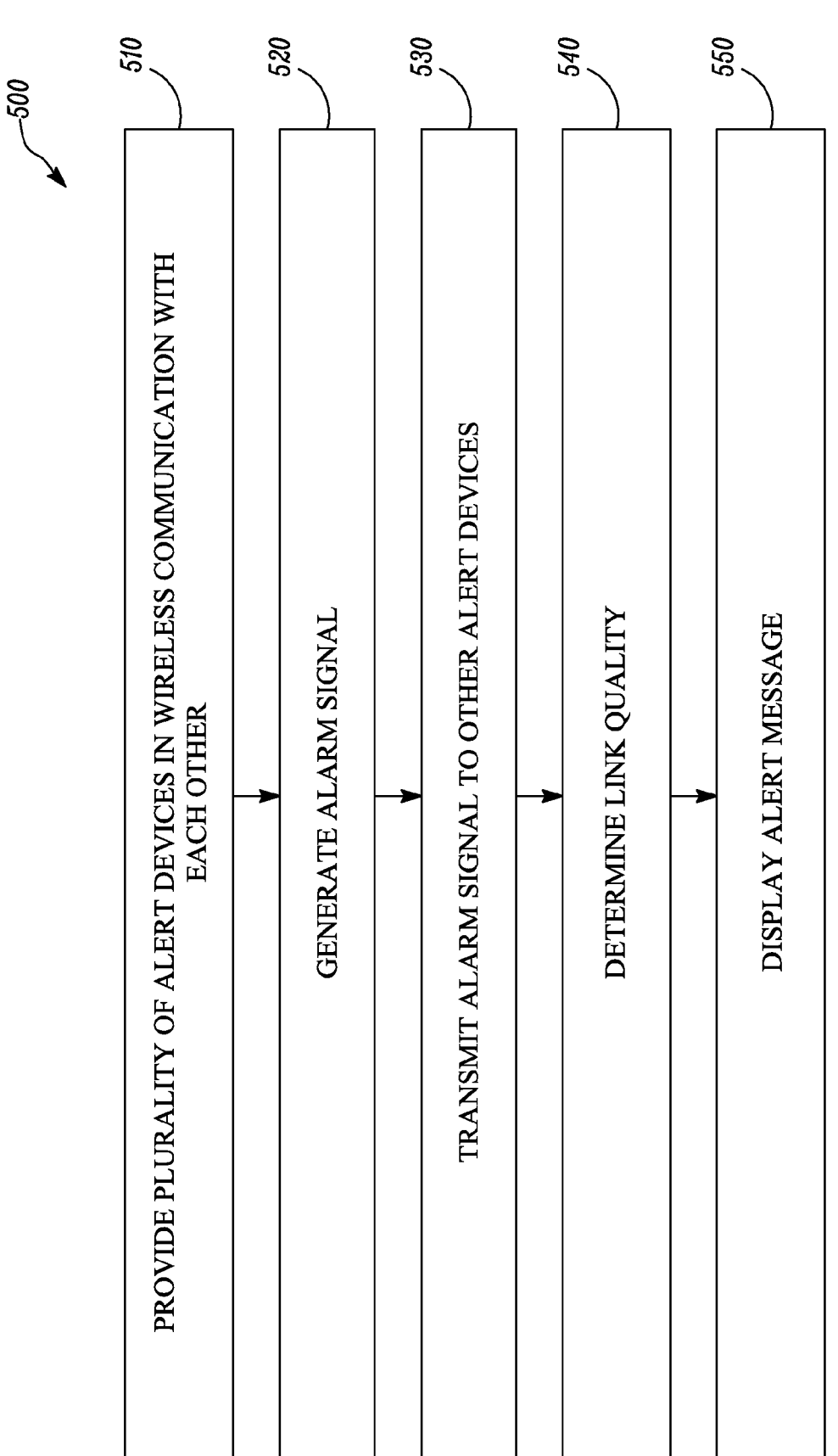
FIG. 5 is a flowchart illustrating various steps of a method according to an embodiment of the present disclosure.

FIG. 4 illustrates a safety system 300. The safety system 300 is substantially similar to the safety system 100 shown in FIG. 1. However, the safety system 300 includes additional components.

The safety system 300 includes a plurality of breathing devices 200A-200E similar to the breathing device 200 shown in FIG. 3. The safety system 300 further includes the plurality of alert devices 120A-120E. Each alert device 120A-120E is communicably coupled with a corresponding breathing device 200A-200E. Furthermore, each breathing device 200A-200E is carried by the corresponding worker 110A-110E.

In the illustrated embodiment of FIG. 4, the worker 110A is in distress. The alert device 120A corresponding to the worker 110A is in the alarm state 142. The other alert devices 120B-120E are in the normal state 140. The alert device 120A, that is communicably coupled to the breathing device 200A, generates the alarm signal 121. The alarm signal 121 from the alert device 120A is received by the alert devices 120B, 120C carried by workers 110B, 110C, respectively.

As illustrated, the workers 110B, 110C are proximal to the worker 110A in distress. The alert devices 120B, 120C corresponding to the workers 110B, 110C may be within a short-range wireless communication (SRWC) range 150 with respect to the alert device 120A corresponding to the worker 110A. Specifically, the wireless transceivers 130 of the alert devices 120A-120C may be disposed in a short-range wireless communication with each other. In some embodiments, the wireless transceivers 130 of the alert devices 120A-120C are disposed in the short-range wireless communication via Bluetooth®. The wireless transceiver 130 of the alert device 120A may utilize the short-range wireless communication to transmit the alarm signal 121 to the wireless transceivers 130 of the alert devices 120B, 120C within the SRWC range 150. The short-range wireless communication between the alert device 120A and the alert devices 120B, 120C is depicted by dashed lines. In some embodiments, the workers 110D, 110E may be distal to the worker 110A. Specifically, the workers 110D, 110E may be outside of the SWRC range 150 with respect to the worker 110A and may not receive the alarm signal 121 from the alert device 120A via the short-range wireless communication. In some embodiments, the alert devices 120A-120E are in a long-range communication with a remote server 400. The long-range wireless communication between the remote server 400 and the alert devices 120A-120E is depicted by solid lines.

Referring to FIGS. 2B, 3 and 4, the remote server 400 is disposed in wireless communication with the wireless transceivers 130 of the plurality of alert devices 120A-120E. In some embodiments, the remote server 400 is disposed in wireless communication with the wireless transceivers 130 of the plurality of alert devices 120A-120E via a radio network. In some embodiments, the radio network is a low-power wide-area network (LPWAN). In some embodiments, the remote server 400 is disposed in wireless communication with the wireless transceivers 130 of the plurality of alert devices 120A-120E via one or more computer networks, cellular networks, local area networks, the Internet, or combinations thereof.

The processor 132 of the at least one alert device 120A (for example, the device 120A corresponding to the worker 110A in distress) is further configured to transmit, via the corresponding wireless transceiver 130, data including the alarm signal 121 to the remote server 400. The processor 132 of each of the other alert devices 120B-120E is further configured to transmit, via the corresponding wireless transceiver 130, data including the alert message to the remote server 400. In some embodiments, the remote server 400 may transmit information regarding the at least one alert device 120A in the alarm state 142 to the alert devices 120B-120E, which are outside the SWRC range 150.

In some embodiments, the remote server 400 is further configured to store the data received from the plurality of alert devices 120A-120E. In some embodiments, the remote server 400 may receive and store the information from the plurality of alert devices 120A-120E for future analysis and investigations. The remote server 400 may further include a user interface 410. The user interface 410 of the remote server 400 may include a mouse, a keyboard, a voice responsive system, a video camera, buttons, a control pad, a microphone, or any other type of device for detecting input from a user. In some examples, the user interface 410 may be a presence-sensitive input component, which may include a presence-sensitive screen, touch-sensitive screen, etc.

The user interface 410 may output a variety of information received by the remote server 400. In some embodiments, the user interface 410 may be configured to receive a user input from remote users (not shown). In some examples, the remote users may be individuals not working in the work environment 101. In some embodiments, the remote users may include responsible supervisors and/or safety managers of the workers 110, personnel of an organization/agency for training the workers 110, and/or personnel of an organization/agency responsible for conducting research and making recommendations for the prevention of hazards and/or work-related injuries. In some other embodiments, the remote users may include an owner of the work environment 101, responsible supervisors for the work environment 101 and/or safety managers for the work environment 101. In some embodiments, the remote server 400 may be additionally or alternatively connected to a cloud 450. The cloud 450 may include a plurality of servers capable of storing and processing information. In some embodiments, the cloud 450 may be in two-way communication with the remote server 400. In other words, the cloud 450 may receive information from the remote server 400. The cloud 450 may further store and process the information. The cloud 450 may further transmit the processed information to the remote server 400. In some embodiments, the cloud 450 may receive and store the information from the remote server 400 for future analysis and investigations.

Referring to FIGS. 1-5, the present disclosure further provides a method 500. The method 500 may be used by emergency personnel, for example, firefighters. The method 500 may include the alert devices 120 described with reference to FIGS. 1, 2A, 2B. In some other embodiments, the method 500 may include the breathing devices 200 described with reference to FIGS. 3 and 4 including the alert devices 120.

At step 510, the method 500 includes providing the plurality of alert devices 120A-120E disposed in wireless communication with each other. Each alert device 120A-120E is associated with the unique identifier 124. In some embodiments, the alert devices 120A-120E may be stand-alone devices. In some other embodiments, the alert devices 120A-120E may be incorporated within the breathing devices 200.

At step 520, the method 500 further includes generating the alarm signal 121 indicative of the alarm state 142 of the at least one alert device 120A from the plurality of alert devices 120B-120E. The alert device 120A may be switched from the normal state 140 to the alarm state 142, either manually by the worker 110A or automatically on detection of an emergency. An example of detection of the emergency may include using information from the motion sensor module 156 operative with the processor 132 to provide an indication as to whether the alert device 120A has been motionless for greater than a predetermined period of time. In some embodiments, generating the alarm signal 121 further includes receiving, by the at least one alert device 120A, the input signal from the corresponding breathing device 200A, and generating the alarm signal 121 based on the input signal. In some embodiments, the method 500 further includes generating, by each alert device 120, the audible alert indicative of the alarm signal 121.

At step 530, the method 500 further includes transmitting the alarm signal 121 to the other alert devices 120B-120E from the plurality of alert devices 120A-120E. The alarm signal 121 includes the unique identifier 124 associated with the at least one alert device 120.

At step 540, the method 500 further includes determining, by each of the other alert devices 120B-120E, the link quality 123 indicative of at least a relative distance between the at least one alert device 120A and the corresponding other alert device 120B-120E. In some embodiments, the link quality 123 is further indicative of the relative direction between the at least one alert device 120A and the corresponding other alert device 120B-120E.

At step 550, the method 500 further includes displaying, by each of the other alert devices 120B-120E, the alert message including the unique identifier 124 of the at least one alert device 120A and the corresponding link quality 123.

In some embodiments, the method 500 further includes storing, by the at least one alert device 120A, the alarm signal 121, and storing, by each of the other alert devices 120B-120E, the unique identifier of the at least one alert device and the corresponding link quality 123.

In some embodiments, the method 500 further includes transmitting, by the at least one alert device 120A, data including the alarm signal 121 to the remote server 400, and transmitting, by each of the other alert devices 120B-120E, data including the alert message to the remote server 400. In some embodiments, the method 500 further includes storing, by the remote server 400, the data received from the plurality of alert devices 120A-120E.

In the present detailed description of the preferred embodiments, reference is made to the accompanying drawings, which illustrate specific embodiments in which the disclosure may be practiced. The illustrated embodiments are not intended to be exhaustive of all embodiments according to the disclosure. It is to be understood that other embodiments may be utilized, and structural or logical changes may be made without departing from the scope of the present disclosure. The following detailed description, therefore, is not to be taken in a limiting sense, and the scope of the present disclosure is defined by the appended claims.

Unless otherwise indicated, all numbers expressing feature sizes, amounts, and physical properties used in the specification and claims are to be understood as being modified in all instances by the term "about". Accordingly, unless indicated to the contrary, the numerical parameters set forth in the foregoing specification and attached claims are approximations that can vary depending upon the desired properties sought to be obtained by those skilled in the art utilizing the teachings disclosed herein.

As used in this specification and the appended claims, the singular forms "a," "an," and "the" encompass embodiments having plural referents, unless the content clearly dictates otherwise. As used in this specification and the appended claims, the term "or" is generally employed in its sense including "and/or" unless the content clearly dictates otherwise.

Spatially related terms, including but not limited to, "proximate," "distal," "lower," "upper," "beneath," "below," "above," and "on top," if used herein, are utilized for ease of description to describe spatial relationships of an element(s) to another. Such spatially related terms encompass different orientations of the device in use or operation in addition to the particular orientations depicted in the figures and described herein. For example, if an object depicted in the figures is turned over or flipped over, portions previously described as below or beneath other elements would then be above or on top of those other elements.

As used herein, when an element, component, or layer for example is described as forming a "coincident interface" with, or being "on," "connected to," "coupled with," "stacked on" or "in contact with" another element, component, or layer, it can be directly on, directly connected to, directly coupled with, directly stacked on, in direct contact with, or intervening elements, components or layers may be on, connected, coupled or in contact with the particular element, component, or layer, for example. When an element, component, or layer for example is referred to as being "directly on," "directly connected to," "directly coupled with," or "directly in contact with" another element, there are no intervening elements, components or layers for example. The techniques of this disclosure may be implemented in a wide variety of computer devices, such as servers, laptop computers, desktop computers, notebook computers, tablet computers, hand-held computers, smart phones, and the like. Any components, modules or units have been described to emphasize functional aspects and do not necessarily require realization by different hardware units. The techniques described herein may also be implemented in hardware, software, firmware, or any combination thereof. Any features described as modules, units or components may be implemented together in an integrated logic device or separately as discrete but interoperable logic devices. In some cases, various features may be implemented as an integrated circuit device, such as an integrated circuit chip or chipset. Additionally, although a number of distinct modules have been described throughout this description, many of which perform unique functions, all the functions of all of the modules may be combined into a single module, or even split into further additional modules. The modules described herein are only exemplary and have been described as such for better ease of understanding.

If implemented in software, the techniques may be realized at least in part by a computer-readable medium comprising instructions that, when executed in a processor, performs one or more of the methods described above. The computer-readable medium may comprise a tangible computer-readable storage medium and may form part of a computer program product, which may include packaging materials. The computer-readable storage medium may comprise random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The computer-readable storage medium may also comprise a non-volatile storage device, such as a hard-disk, magnetic tape, a compact disk (CD), digital versatile disk (DVD), Blu-ray disk, holographic data storage media, or other non-volatile storage device.

The term "processor," as used herein may refer to any of the foregoing structure or any other structure suitable for implementation of the techniques described herein. In addition, in some aspects, the functionality described herein may be provided within dedicated software modules or hardware modules configured for performing the techniques of this disclosure. Even if implemented in software, the techniques may use hardware such as a processor to execute the software, and a memory to store the software. In any such cases, the computers described herein may define a specific machine that is capable of executing the specific functions described herein. Also, the techniques could be fully implemented in one or more circuits or logic elements, which could also be considered a processor.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and micro-wave, then the coaxial cable, fiber optic cable, twisted pair, DSL, or wireless technologies such as infrared, radio, and microwave are included in the definition of medium. It should be understood, however, that computer-readable stor-age media and data storage media do not include connec-tions, carrier waves, signals, or other transient media, but are instead directed to non-transient, tangible storage media. Disk and disc, as used, includes compact disc (CD), laser disc, optical disc, digital versatile disc (DVD), floppy disk and Blu-ray disc, where disks usually reproduce data mag-netically, while discs reproduce data optically with lasers. Combinations of the above should also be included within the scope of computer-readable media.

Instructions may be executed by one or more processors, such as one or more digital signal processors (DSPs), general purpose microprocessors, application specific inte-grated circuits (ASICs), field programmable logic arrays (FPGAs), or other equivalent integrated or discrete logic circuitry. Accordingly, the term "processor", as used may refer to any of the foregoing structure or any other structure suitable for implementation of the techniques described. In addition, in some aspects, the functionality described may be provided within dedicated hardware and/or software mod-ules. Also, the techniques could be fully implemented in one or more circuits or logic elements.

The techniques of this disclosure may be implemented in a wide variety of devices or apparatuses, including a wire-less handset, an integrated circuit (IC) or a set of ICs (e.g., a chip set). Various components, modules, or units are described in this disclosure to emphasize functional aspects of devices configured to perform the disclosed techniques, but do not necessarily require realization by different hard-ware units. Rather, as described above, various units may be combined in a hardware unit or provided by a collection of interoperative hardware units, including one or more pro-cessors as described above, in conjunction with suitable software and/or firmware.

It is to be recognized that depending on the example, certain acts or events of any of the methods described herein can be performed in a different sequence, may be added, merged, or left out altogether (e.g., not all described acts or events are necessary for the practice of the method). More-over, in certain examples, acts or events may be performed concurrently, e.g., through multi-threaded processing, inter-rupt processing, or multiple processors, rather than sequen-tially.

In some examples, a computer-readable storage medium includes a non-transitory medium. The term "non-transi-tory" indicates, in some examples, that the storage medium is not embodied in a carrier wave or a propagated signal. In certain examples, a non-transitory storage medium stores data that can, over time, change (e.g., in RAM or cache).

Various examples have been described. These and other examples are within the scope of the following claims.

The invention claimed is:

1. A safety system comprising:
a plurality of alert devices, each alert device associated with a unique identifier and comprising:
a user interface comprising a display;
a wireless transceiver; and
a processor communicably coupled to the wireless transceiver;
wherein:
the wireless transceivers of the plurality of alert devices are disposed in wireless communication with each other;
the processor of at least one alert device is config-ured to:
generate an alarm signal indicative of an alarm state of the at least one alert device; and
transmit, via the corresponding wireless trans-ceiver, the alarm signal to the wireless trans-ceivers of other alert devices from the plurality of alert devices, the alarm signal comprising the unique identifier of the at least one alert device; and
the processor of each of the other alert devices is configured to:
receive, via the corresponding wireless trans-ceiver, the alarm signal from the at least one alert device;
determine a link quality indicative of at least a relative distance and a relative direction between the at least one alert device and the corresponding other alert device, wherein the link quality decreases with respect to an increase in the relative distance between the at least one alert device and the corresponding other alert device and varies with respect to the relative direction between at least one alert device and the corresponding other alert device; and
display, via the display of the corresponding user interface, an alert message comprising the unique identifier of the at least one alert device and the corresponding link quality.

2. The safety system of claim 1, wherein each alert device further comprises a memory communicably coupled to the processor, wherein the processor of the at least one alert device is further configured to store the alarm signal in the corresponding memory, and wherein the processor of each of the other alert devices is further configured to store the unique identifier of the at least one alert device and the corresponding link quality in the corresponding memory.

3. The safety system of claim 1, further comprising a remote server disposed in wireless communication with the wireless transceivers of the plurality of alert devices, wherein the processor of the at least one alert device is further configured to transmit, via the corresponding wireless transceiver, data including the alarm signal to the remote server, and wherein the processor of each of the other alert devices is further configured to transmit, via the corresponding wireless transceiver, data including the alert message to the remote server.

4. The safety system of claim 3, wherein the remote server is further configured to store the data received from the plurality of alert devices.

5. The safety system of claim 3, wherein the remote server is disposed in wireless communication with the wireless transceivers of the plurality of alert devices via a radio network.

6. The safety system of claim 5, wherein the radio network is a low-power wide-area network.

7. The safety system of claim 1, wherein the wireless transceivers of the plurality of alert devices are disposed in wireless communication via Bluetooth.

8. The safety system of claim 1, wherein the user interface of each alert device further comprises an audible indicator, wherein the audible indicator of each alert device is configured to generate an audible alert indicative of the alarm signal.

9. The safety system of claim 1, wherein each alert device further comprises a housing and one or more buttons disposed on the housing, wherein the display is disposed on the housing, and wherein the processor of each of the other alert devices is further configured to change one or more parameters of the corresponding alert message displayed on the display based on user inputs received at the one or more buttons.

10. The safety system of claim 1, further comprising a plurality of breathing devices, each alert device being communicably coupled with a corresponding breathing device from the plurality of breathing devices.

11. The safety system of claim 10, wherein the at least one alert device is further configured to receive an input signal from the corresponding breathing device and generate the alarm signal based on the input signal.

12. The safety system of claim 1, wherein the alarm signal further comprises a timestamp indicative of a time of generation of the alarm signal.

13. A method comprising:
providing a plurality of alert devices disposed in wireless communication with each other, each alert device associated with a unique identifier;
generating an alarm signal indicative of an alarm state of at least one alert device from the plurality of alert devices;
transmitting the alarm signal to other alert devices from the plurality of alert devices, wherein the alarm signal comprises the unique identifier associated with the at least one alert device;
determining, by each of the other alert devices, a link quality indicative of at least a relative distance and a relative direction between the at least one alert device and the corresponding other alert device, wherein the link quality decreases with respect to an increase in the relative distance between the at least one alert device and the corresponding other alert device and varies with respect to the relative direction between at least one alert device and the corresponding other alert device; and
displaying, by each of the other alert devices, an alert message comprising the unique identifier of the at least one alert device and the corresponding link quality.

14. The method of claim 13, further comprising storing, by the at least one alert device, the alarm signal, and storing, by each of the other alert devices, the unique identifier of the at least one alert device and the corresponding link quality.

15. The method of claim 13, further comprising transmitting, by the at least one alert device, data including the alarm signal to a remote server, and transmitting, by each of the other alert devices, data including the alert message to the remote server.

16. The method of claim 15, further comprising storing, by the remote server, the data received from the plurality of alert devices.

17. The method of claim 13, further comprising generating, by each alert device, an audible alert indicative of the alarm signal.

18. The method of claim 13, wherein generating the alarm signal further comprises receiving, by the at least one alert device, an input signal from a corresponding breathing device, and generating the alarm signal based on the input signal.

* * * * *